US011760387B2

(12) United States Patent
Raichelgauz et al.

(10) Patent No.: US 11,760,387 B2
(45) Date of Patent: Sep. 19, 2023

(54) DRIVING POLICIES DETERMINATION

(71) Applicant: Cortica Ltd., Tel Aviv (IT)

(72) Inventors: Igal Raichelgauz, Tel Aviv (IL);
Karina Odinaev, Tel Aviv (IL);
Yehoshua Y Zeevi, Haifa (IL)

(73) Assignee: AUTOBRAINS TECHNOLOGIES LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/628,749

(22) PCT Filed: Jul. 4, 2018

(86) PCT No.: PCT/IL2018/050724
§ 371 (c)(1),
(2) Date: Jan. 6, 2020

(87) PCT Pub. No.: WO2019/008581
PCT Pub. Date: Jan. 10, 2019

(65) Prior Publication Data
US 2020/0283030 A1    Sep. 10, 2020

Related U.S. Application Data

(60) Provisional application No. 62/528,745, filed on Jul. 5, 2017.

(51) Int. Cl.
*B60W 60/00* (2020.01)
*B60W 50/08* (2020.01)
*G06V 20/56* (2022.01)

(52) U.S. Cl.
CPC ...... *B60W 60/00272* (2020.02); *B60W 50/08* (2013.01); *B60W 60/0015* (2020.02);
(Continued)

(58) Field of Classification Search
CPC ....... B60W 60/00272; B60W 60/0015; B60W 50/08; B60W 2556/10; B60W 2540/21;
(Continued)

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

EP    1085464 A3    1/2007

OTHER PUBLICATIONS

Description of Light-Vehicle Pre-Crash Scenarios for Safety Applications Based on Vehicle-to-Vehicle Communications:, NHTSA DOT HS 811 731, May 2013 (Year: 2013).*

(Continued)

*Primary Examiner* — Peter D Nolan
*Assistant Examiner* — Tanya C Sienko
(74) *Attorney, Agent, or Firm* — Reches Patents

(57) ABSTRACT

A method for determining driving policies for a vehicle includes: receiving, in real-time during a trip of a vehicle, at least a set of input multimedia content elements captured by at least one sensor deployed in proximity to the vehicle, determining a plurality of possible future scenarios based at least on the set of input multimedia content elements, determining a probability score for each of the plurality of possible future scenarios, determining at least one driving policy according to at least the probability score for at least one of the plurality of possible future scenarios, and controlling the vehicle according to the at least one driving policy.

20 Claims, 5 Drawing Sheets

(52) U.S. Cl.
CPC ......... *G06V 20/56* (2022.01); *B60W 2540/21* (2020.02); *B60W 2556/10* (2020.02); *B60W 2556/45* (2020.02)

(58) Field of Classification Search
CPC .. B60W 2556/45; G06K 9/00791; G08G 1/16
See application file for complete search history.

(56) References Cited

U.S. PATENT DOCUMENTS

| | | | |
|---|---|---|---|
| 4,972,363 A | 11/1990 | Nguyen et al. | |
| 5,078,501 A | 1/1992 | Hekker et al. | |
| 5,214,746 A | 5/1993 | Fogel et al. | |
| 5,307,451 A | 4/1994 | Clark | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador et al. | |
| 5,745,678 A | 4/1998 | Herzberg et al. | |
| 5,754,938 A | 5/1998 | Herz et al. | |
| 5,763,069 A | 6/1998 | Jordan | |
| 5,806,061 A | 9/1998 | Chaudhuri et al. | |
| 5,835,087 A | 11/1998 | Herz et al. | |
| 5,835,901 A | 11/1998 | Duvoisin et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,926,812 A | 7/1999 | Hilsenrath et al. | |
| 5,978,754 A | 11/1999 | Kumano | |
| 5,991,306 A | 11/1999 | Burns et al. | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A | 12/2000 | Lee et al. | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,314,419 B1 | 11/2001 | Faisal | |
| 6,329,986 B1 | 12/2001 | Cheng | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,507,672 B1 | 1/2003 | Watkins et al. | |
| 6,523,046 B2 | 2/2003 | Liu et al. | |
| 6,524,861 B1 | 2/2003 | Anderson | |
| 6,546,405 B2 | 4/2003 | Gupta et al. | |
| 6,550,018 B1 | 4/2003 | Abonamah et al. | |
| 6,557,042 B1 | 4/2003 | He et al. | |
| 6,594,699 B1 | 7/2003 | Sahai et al. | |
| 6,601,026 B2 | 7/2003 | Appelt et al. | |
| 6,611,628 B1 | 8/2003 | Sekiguchi et al. | |
| 6,618,711 B1 | 9/2003 | Ananth | |
| 6,640,015 B1 | 10/2003 | Lafruit | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,681,032 B2 | 1/2004 | Bortolussi et al. | |
| 6,704,725 B1 | 3/2004 | Lee | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,985,172 B1 | 1/2006 | Rigney et al. | |
| 7,013,051 B2 | 3/2006 | Sekiguchi et al. | |
| 7,020,654 B1 | 3/2006 | Najmi | |
| 7,023,979 B1 | 4/2006 | Wu et al. | |
| 7,043,473 B1 | 5/2006 | Rassool et al. | |
| 7,158,681 B2 | 1/2007 | Persiantsev | |
| 7,215,828 B2 | 5/2007 | Luo | |
| 7,260,564 B1 | 8/2007 | Lynn et al. | |
| 7,289,643 B2 | 10/2007 | Brunk et al. | |
| 7,299,261 B1 | 11/2007 | Oliver et al. | |
| 7,302,089 B1 | 11/2007 | Smits | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,346,629 B2 | 3/2008 | Kapur et al. | |
| 7,353,224 B2 | 4/2008 | Chen et al. | |
| 7,376,672 B2 | 5/2008 | Weare | |
| 7,383,179 B2 | 6/2008 | Alves et al. | |
| 7,433,895 B2 | 10/2008 | Li et al. | |
| 7,464,086 B2 | 12/2008 | Black et al. | |
| 7,529,659 B2 | 5/2009 | Wold | |
| 7,657,100 B2 | 2/2010 | Gokturk et al. | |
| 7,660,468 B2 | 2/2010 | Gokturk et al. | |
| 7,801,893 B2 | 9/2010 | Gulli | |
| 7,805,446 B2 | 9/2010 | Potok et al. | |
| 7,860,895 B1 | 12/2010 | Scofield et al. | |
| 7,872,669 B2 | 1/2011 | Darrell et al. | |
| 7,921,288 B1 | 4/2011 | Hildebrand | |
| 7,933,407 B2 | 4/2011 | Keidar et al. | |
| 8,023,739 B2 | 9/2011 | Hohimer et al. | |
| 8,266,185 B2 | 9/2012 | Raichelgauz et al. | |
| 8,275,764 B2 | 9/2012 | Jeon | |
| 8,285,718 B1 | 10/2012 | Ong et al. | |
| 8,312,031 B2 | 11/2012 | Raichelgauz et al. | |
| 8,315,442 B2 | 11/2012 | Gokturk et al. | |
| 8,345,982 B2 | 1/2013 | Gokturk et al. | |
| 8,386,400 B2 | 2/2013 | Raichelgauz et al. | |
| 8,396,876 B2 | 3/2013 | Kennedy et al. | |
| 8,418,206 B2 | 4/2013 | Bryant et al. | |
| RE44,225 E | 5/2013 | Aviv | |
| 8,442,321 B1 | 5/2013 | Chang et al. | |
| 8,457,827 B1 | 6/2013 | Ferguson et al. | |
| 8,495,489 B1 | 7/2013 | Everingham | |
| 8,527,978 B1 | 9/2013 | Sallam | |
| 8,634,980 B1 | 1/2014 | Urmson | |
| 8,635,531 B2 | 1/2014 | Graham et al. | |
| 8,655,801 B2 | 2/2014 | Raichelgauz et al. | |
| 8,655,878 B1 | 2/2014 | Kulkarni et al. | |
| 8,781,152 B2 | 7/2014 | Momeyer | |
| 8,782,077 B1 | 7/2014 | Rowley | |
| 8,799,195 B2 | 8/2014 | Raichelgauz et al. | |
| 8,799,196 B2 | 8/2014 | Raichelquaz et al. | |
| 8,818,916 B2 | 8/2014 | Raichelgauz et al. | |
| 8,868,861 B2 | 10/2014 | Shimizu et al. | |
| 8,886,648 B1 | 11/2014 | Procopio et al. | |
| 8,954,887 B1 | 2/2015 | Tseng et al. | |
| 8,990,199 B1 | 3/2015 | Ramesh et al. | |
| 9,009,086 B2 | 4/2015 | Raichelgauz et al. | |
| 9,104,747 B2 | 8/2015 | Raichelgauz et al. | |
| 9,165,406 B1 | 10/2015 | Gray et al. | |
| 9,298,763 B1 | 3/2016 | Zack | |
| 9,311,308 B2 | 4/2016 | Sankarasubramaniam et al. | |
| 9,323,754 B2 | 4/2016 | Ramanathan et al. | |
| 9,440,647 B1 | 9/2016 | Sucan | |
| 9,466,068 B2 | 10/2016 | Raichelgauz et al. | |
| 9,646,006 B2 | 5/2017 | Raichelgauz et al. | |
| 9,679,062 B2 | 6/2017 | Schillings et al. | |
| 9,701,307 B1 * | 7/2017 | Newman | B60W 10/04 |
| 9,734,533 B1 | 8/2017 | Givot | |
| 9,807,442 B2 | 10/2017 | Bhatia et al. | |
| 9,875,445 B2 | 1/2018 | Amer et al. | |
| 9,984,369 B2 | 5/2018 | Li et al. | |
| 10,133,947 B2 | 11/2018 | Yang | |
| 10,347,122 B2 | 7/2019 | Takenaka | |
| 10,491,885 B1 | 11/2019 | Hicks | |
| 10,671,076 B1 * | 6/2020 | Kobilarov | G05D 1/0255 |

(56) References Cited

U.S. PATENT DOCUMENTS

| | | |
|---|---|---|
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0105423 A1* | 8/2002 | Rast .................. G08G 1/162 340/479 |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stenliford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelqauz |
| 2010/0082684 A1 | 4/2010 | Churchill |

(56) References Cited

U.S. PATENT DOCUMENTS

| | | |
|---|---|---|
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0124076 A1* | 5/2013 | Bruni .................. G08G 5/0078 |
| | | 701/120 |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1* | 2/2014 | Sato .................. G06V 20/58 |
| | | 382/103 |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0004742 A1* | 1/2016 | Mohan ................ G06F 16/2365 |
| | | 707/694 |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0010618 A1* | 1/2017 | Shashua ................ G05D 1/0246 |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0233047 A1* | 8/2018 | Mandeville-Clarke ...................... |
| | | G08G 1/166 |
| 2018/0268695 A1* | 9/2018 | Agnew ................ B60K 28/066 |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0377354 A1* | 12/2019 | Shalev-Shwartz ....... G08G 1/16 |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |

(56) References Cited

U.S. PATENT DOCUMENTS

| | | |
|---|---|---|
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |
| 2020/0189574 A1* | 6/2020 | Vignard ................ B60W 30/09 |

OTHER PUBLICATIONS

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

Zhou et al, "Medical Diagnosis With C4 5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

"Computer Vision Demonstration Website", Electronics and Computer Science, University of Southampton, 2005, USA.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society 2010; pp. 52-60. (Year: 2010).

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Lin et al., "Generating robust digital signature for image/video authentication", Multimedia and Security Workshop at ACM Multimedia '98, Bristol, U.K., Sep. 1998, pp. 245-251.

Lyon, "Computational Models of Neural Auditory Processing", IEEE International Conference on Acoustics, Speech, and Signal Processing, ICASSP '84, Date of Conference: Mar. 1984, vol. 9, pp. 41 44.

May et al, "The Transputer", Springer-Verlag Berlin Heidelberg 1989, vol. 41.

McNamara et al., "Diversity Decay in opportunistic Content Sharing Systems", 2011 IEEE International Symposium an a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue an Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Santos et al., "SCORM-MPEG: an Ontology of Interoperable Metadata for multimediaand E-Leaming", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Stolberg et al ("Hibrid-Soc: A Multi-Core Soc Architecture for Multimedia Signal Processing" (2003).

Stolberg et al, "Hibrid-Soc: a Mul Ti-Core Soc Architecture for Mul timedia Signal Processing", 2003 IEEE, pp. 189-194.

Theodoropoulos et al, "Simulating Asynchronous Architectures on Transputer Networks", Proceedings of the Fourth Euromicro Workshop on Parallel and Distributed Processing, 1996 PDP '96, pp. 274-281.

(56) References Cited

OTHER PUBLICATIONS

Vallet et al ("Personalized Content Retrieval in Context Using Ontological Knowledge" Mar. 2007) (Year: 2007).
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139 144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.

* cited by examiner

DRIVING POLICIES DETERMINATION

RELATED APPLICATION INFORMATION

The present application claims the benefit of priority from U.S. Provisional Patent Application, Ser. No. 62/528,745 filed on Jul. 5, 2017 which is incorporated herein in its entirety.

TECHNICAL FIELD

The present disclosure relates generally to vehicle driving systems, and more particularly to determining driving policies based on analysis of multimedia content.

BACKGROUND

In part due to improvements in computer processing power and in location-based tracking systems such as global positioning systems, autonomous and other assisted driving systems have been developed with the aim of providing driverless control or driver-assisted control of vehicles while in movement. An autonomous vehicle includes a system for controlling the vehicle based on the surrounding environment such that the system autonomously controls functions such as acceleration, braking, steering, and the like.

Existing solutions for autonomous driving may use a global positioning system receiver, electronic maps, and the like, to determine a path from one location to another. Understandably, fatalities and injuries due to vehicles colliding with people or obstacles during the determined path are significant concerns for developers of autonomous driving systems. To this end, autonomous driving systems may utilize sensors such as cameras and radar for detecting objects to be avoided.

BRIEF DESCRIPTION OF THE DRAWINGS

The subject matter that is disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DESCRIPTION OF EXAMPLE EMBODIMENTS

Overview

A method for determining driving policies for a vehicle includes: receiving, in real-time during a trip of a vehicle, at least a set of input multimedia content elements captured by at least one sensor deployed in proximity to the vehicle, determining a plurality of possible future scenarios based at least on the set of input multimedia content elements, determining a probability score for each of the plurality of possible future scenarios, determining at least one driving policy according to at least the probability score for at least one of the plurality of possible future scenarios, and controlling the vehicle according to the at least one driving policy.

Description

It will be appreciated that as autonomous vehicles are introduced they will have to co-exist in the near future with non-autonomous vehicles, and even among autonomous vehicles, additional safety precautions may be necessary before they are safe enough for reliable, general use.

For example, some existing autonomous driving solutions engage in automatic or otherwise autonomous braking to avoid and/or minimize damage from collisions. However, such solutions may face challenges in accurately identifying obstacles. Moreover, such solutions typically employ a configured setting for braking or deceleration in response to the detection of a potential collision event. Such a setting does not necessarily account for the continued inertia and/or changes in movement of the obstacle being avoided. As a result, the automatically braking vehicle may stop unnecessarily quickly or conversely may not stop quickly enough.

Accordingly, in practice such solutions may not successfully prevent the collision event from occurring. In fact, in some cases the solutions may actually be a contributary factor in causing a collision, even if not necessarily the initially detected potential collision event. For example, stopping quickly to avoid an obstacle in front of the car may result in a rear-end collision caused by a vehicle behind the autonomously braking vehicle.

It will therefore be appreciated that such solutions typically suffer from a lack of proper consideration for the overall context for the detection of a potential collision event. It would therefore be advantageous to provide a solution for accurately detecting obstacles and determining possible scenarios respective thereof.

Figure 1:
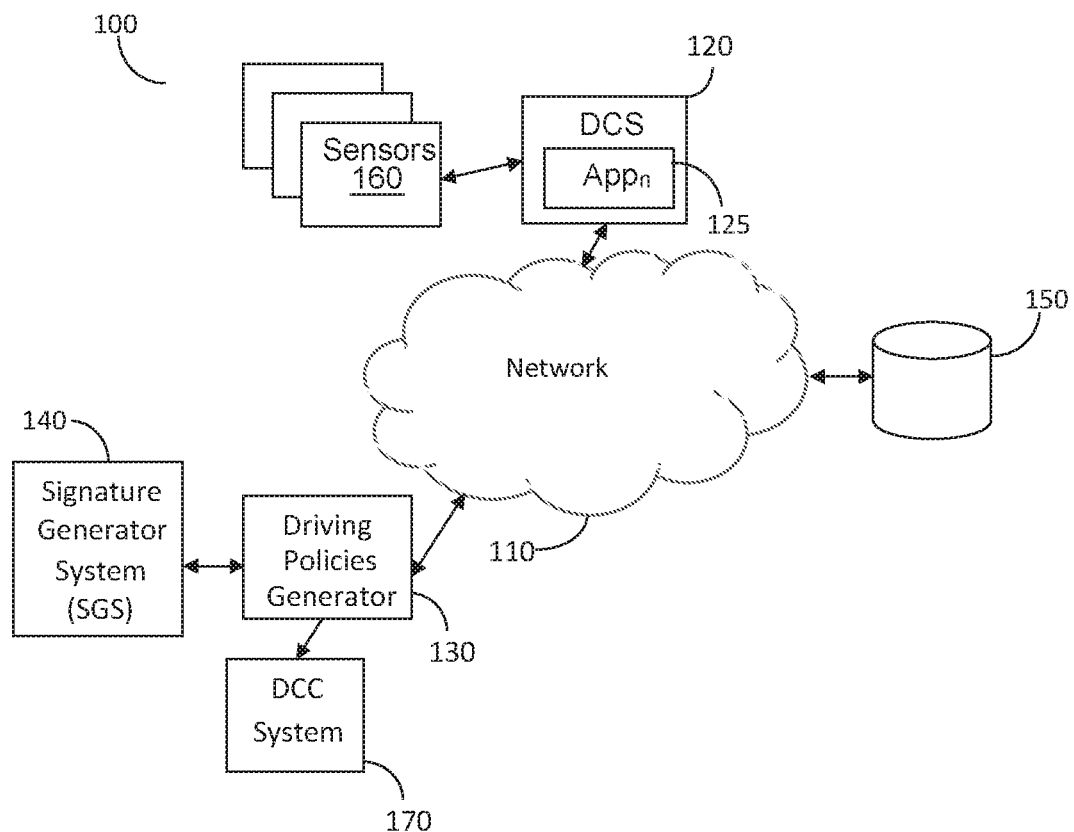
FIG. 1 is a network diagram utilized to describe the various disclosed embodiments.

Reference is now made to FIG. 1 which is an exemplary network diagram 100 utilized to describe the various embodiments disclosed herein. Network diagram 100 comprises a driving control system (DCS) 120, a driving policies generator 130, a database 150, and at least one sensor 160, communicatively connected via a network 110. Network 110 may be implemented using one or more of the Internet, the world-wide-web (WWW), a local area network (LAN), a wide area network (WAN), a metro area network (MAN), and/or any other network(s) capable of enabling communication between the elements of network diagram 100.

Driving control system 120 is configured to control the vehicle (not shown), or at least a function thereof, either autonomously or at least semi-autonomously subject to driving policies determined by driving policies generator 130 in real-time during a trip of the vehicle based on sensor signals captured by sensors 160 deployed in proximity to the vehicle. While FIG. 1 depicts a single driving control system 120, it will be appreciated that in practice the overall functionality of driving control system 120 may be provided by a multiplicity of such systems. For example, driving control system 120 may interface with one or more of the vehicle's electronic control units (ECUs) to control the vehicle. Alternatively, in some implementations one or more of the vehicle's ECUs may be configured to function as additional driving control systems 120 that may communicate directly with driving policies generator 130.

In accordance with an exemplary embodiment, one, some, or all of driving control system 120, driving policies generator 130, sensor(s) 160 may be disposed in or affixed to the vehicle. It will be appreciated that the trip includes movement of the vehicle from at least a start location to a destination location. During the trip, at least visual multimedia content elements are captured by the sensors 160.

At least one of sensors 160 is configured to capture visual multimedia content elements demonstrating characteristics of at least a portion of the environment (e.g., roads, obstacles, etc.) surrounding the vehicle. In an example implementation, sensors 160 may include one or more cameras installed on a portion of a vehicle such as, but not limited to, a dashboard of the vehicle, a hood of the vehicle, a rear window of the vehicle, and the like. The visual multimedia content elements may include images, videos, and the like. The sensors 160 may be integrated in or communicatively connected to the driving control system 120 without departing from the scope of the disclosed embodiments.

In accordance with some embodiments described herein, one or more other sensors 160 may be configured to capture audio signals in the vicinity of the vehicle. For example, sensors 160 may include one or more microphones mounted in one or more locations on the vehicle's exterior. The microphone(s) may be disposed to capture ambient sounds in the driving environment, e.g., honking, shouting, brakes screeching, etc. Alternatively, or in addition, a microphone may also be located within the vehicle and disposed to capture sounds from, for example, passenger conversations, cellphone conversations, the vehicle's radio, and/or and an entertainment system (either as an integrated component of the vehicle and/or associated with an electronic device carried by one of the passengers).

Alternatively, or in addition, sensors 160 may be at least in part implemented using a vehicle's embedded electronic control units (ECUs). For example, ECUs controlling one or more of the vehicle's doors, windows, engine, power steering, seats, speed, telematics, transmission, brakes, battery, may also be leveraged to provide input regarding an environmental state for the vehicle. It will be appreciated that such ECUs may typically be connected to an onboard computer in the vehicle. In accordance with some embodiments described herein, driving control system 120 and/or driving policies generator 130 may be connected to, or even integrated as part of, the vehicle's onboard computer, such that no additional infrastructure may be necessary to receive sensor input from the vehicle's ECUs.

Alternatively, or in addition, one or more of sensors 160 may be implemented as a service, providing vehicle environment data from sensors operated independently of the vehicle. For example, a camera installed at a key intersection may provide "look ahead" images, or at least an angle or view not available to a camera mounted in or on the vehicle. In another example, the service may provide information regarding weather, traffic, and/or other environmental conditions.

Driving control system 120 may comprise an application 125 which may be implemented in software, hardware, firmware, or a combination thereof. Application 125 may be configured to send multimedia content elements and/or other environmental information captured by sensors 160 to driving policies' generator 130, and to receive policies therefrom. Application 125 may be further configured to receive collision avoidance instructions to be executed by driving control system 120 from driving policies' generator 130.

Database 150 may store a plurality of scenarios and associated potential causes and effects of collisions, probability scores, collision risk parameters, automatic braking instructions, and/or a combination thereof. Potential causes may include, but are not limited to, moving objects (e.g., other vehicles, pedestrians, animals, etc.), static objects (e.g., parked cars, buildings, boardwalks, trees, bodies of water, etc.), and/or current environmental conditions (rain, temperature, etc.). Each scenario represents a future possible series of events that leads to one or more outcomes. For example, given a pedestrian walking in proximity to an intersection in front of a vehicle in motion, one scenario may be that the pedestrian will cross the intersection, and one possible outcome may be a collision between the pedestrian and the vehicle. Another possible outcome may be that the pedestrian runs across the intersection and there is no collision. It will be appreciated that the possible outcomes listed herein are exemplary; in practice there may be other results as well.

A probability score for each of the plurality of scenarios may be stored in database 150. In accordance with embodiments described herein, the probability score may be calculated based on analysis of actual observations of the scenarios as they have occurred. For example, traffic videos may be used to identify scenarios and then to use them to populate database 150. The actual observed outcomes for each of the identified scenarios may be analyzed to calculate a probability score for each possible outcome. For example, given X occurrences observed for a given scenario with possible outcomes A and B: if outcome A is observed Y times, then its probability score may be calculated as Y/X; if outcome B is observed Z times, then its probability score may be calculated as Z/X, etc. Alternatively, or in addition, some or all of the probability scores may be input to database 150 manually. It will be appreciated that the embodiments described herein may support other methods of determining probability scores and populating database 150.

Using the abovementioned example, the speed and route of both the vehicle and the pedestrian, may be used to determine a probability score for each of the possible outcomes, where a risk score may represent the likelihood of a worst-case outcome, e.g., a collision between them the vehicle and the pedestrian. It will be appreciated that in scenarios there may be more than one undesirable outcome. For example, in a given scenario there may be a probability score reflecting the probability that the vehicle may make contact with a pedestrian or a second vehicle. In the same scenario there may also be a probability score reflecting the probability that the vehicle may hit a telephone pole when swerving to avoid the pedestrian or vehicle. In such a scenario, the risk score may be calculated to represent a combined, weighted probability for either undesirable outcome to occur.

As depicted in FIG. 1, network diagram 110 also comprises signature generator system (SGS) 140 and deep-content classification (DCC) system 170. In accordance with embodiments described herein SGS 140 and DCC system 170 are connected to the network 110 and may be utilized by the driving policies generator 130 to perform various embodiments described herein. It will be appreciated that each of SGS 140 and DCC system 170 may be connected to the Driving Policies Generator 130 either directly or through the network 110. In certain configurations, SGS 140, DCC system 170, and/or both may alternatively be embedded in driving policies generator 130.

SGS 140 is configured to generate signatures for multimedia content elements and comprises a plurality of computational cores, each computational core having properties that are at least partially statistically independent of each other core, where the properties of each core are set independently of the properties of each other core. Generation of signatures by the signature generator system is described further herein below with respect to FIGS. 4 and 5.

Deep content classification system 170 is configured to create, automatically and in an unsupervised fashion, concepts for a wide variety of multimedia content elements. To this end, deep content classification system 170 may be configured to inter-match patterns between signatures for a plurality of multimedia content elements and to cluster the signatures based on the inter-matching. Deep content classification system 170 may be further configured to generate reduced signature clusters by reducing the number of signatures in a cluster to a minimum while maintaining matching and enabling generalization to new multimedia content elements. Metadata of the multimedia content elements is collected to form, together with each of the reduced signature clusters, a concept. An example deep content classification system is described further in U.S. Pat. No. 8,266,185, which is assigned to the common assignee, the contents of which are hereby incorporated by reference. It will be appreciated that the configuration of SGS 140 and DCC 170 in network diagram 110 may be exemplary; the embodiments described herein may also support the use of other methods/systems to identify/classify the input multimedia content elements and/or to associate them with the scenarios and probability scores stored in database 150.

In an embodiment, driving policies generator 130 may be configured to send the input multimedia content elements to signature generator system 140, to deep content classification system 170, or both. Additionally, driving policies generator 130 may also be configured to receive a plurality of signatures generated for the input multimedia content elements from signature generator system 140, to receive a plurality of signatures (e.g., signature reduced clusters) of concepts matched to the input multimedia content elements from deep content classification system 170, or both. Alternatively, or in addition, driving policies' generator 130 may be configured to generate the plurality of signatures, identify the plurality of signatures (e.g., by determining concepts associated with the signature reduced clusters matching the multimedia content element to be tagged), or a combination thereof.

It will be appreciated that each signature is associated with at least one concept. A concept may be understood as a description of the content for which the signature was generated. Each concept comprises a collection of signatures representing associated multimedia content elements and metadata describing the concept. As a non-limiting example, a 'Superman concept' is a signature-reduced cluster of signatures describing elements (such as multimedia elements) related to, e.g., a Superman cartoon, and a set of metadata providing textual representation of the Superman concept. As another example, metadata of a concept represented by the signature generated for a picture showing a bouquet of red roses may be "flowers". In yet another example, metadata of a concept represented by the signature generated for a picture showing a bouquet of wilted roses may be "wilted flowers".

In accordance with embodiments described herein, driving policies generator 130 may be configured to determine a context of the input multimedia content elements based on their signatures, associated concepts, and/or both. Determination of the context allows for contextually matching between a potential cause of collision according to the input multimedia content elements and a predetermined potential cause of collision shown in a reference multimedia content element. Determining contexts of multimedia content elements is described further in U.S. patent application Ser. No. 13/770,603, assigned to the common assignee, the contents of which are hereby incorporated by reference.

In accordance with embodiments described herein, driving policies generator 130 may be configured to obtain, in real-time, or at least near real-time, input multimedia content elements from driving control system 120 that are captured by sensors 160 during the trip. It will be appreciated that at least some of the input multimedia content elements may be visual multimedia content elements showing obstacles that may lead to one or more future scenarios based on the current vehicle movement and the characteristics of the obstacle. For each future scenario, driving policies generator 130 may generate a probability score indicating the probability of that scenario occurring. The probability score may be generated by comparing one or more historical scenarios to each of the future possible scenarios that may occur based at least on the vehicle's movement and the obstacle's expected behavior. The obstacle may be, for example, pedestrians, animals, other vehicles, etc. It will be appreciated that the embodiments described herein may also support the use of other environmental factors as input when generating probability scores. For example, some of the historical scenarios may be associated with poor visibility and/or unsafe road conditions. These additional environmental factors may also be factored into the generation of probability scores, e.g., the presence of fog and/or slippery road conditions may increase the likelihood of an undesirable outcome.

In accordance with embodiments described herein, driving policies generator 130 may be configured to determine whether any reference multimedia content element matches the input multimedia content elements and, if so, to determine a probability score accordingly, e.g., per a probability score stored in database 150 for a scenario associated with the matched reference multimedia content element. For example, if the matched reference multimedia content element is a puddle on the road, the probability scores may reflect the likelihood for each possible outcome (e.g., how likely is it that the car may skid, the engine may be flooded, there may be no effect, etc.) as per the stored probability scores in database 150.

In accordance with embodiments described herein, determining whether there is a matching reference multimedia content element includes generating at least one signature for each input multimedia content element and comparing the generated input multimedia content signatures to signatures of the reference multimedia content elements. It will be appreciated that driving policies generator 130 may be configured to send the input multimedia content elements to SGS 140, to deep content classification system 170, and/or both. Driving policies generator 130 may further be configured to receive the generated signatures (e.g., from SGS 140) and/or at least one concept matching the input multimedia content elements (e.g., from DCC system 170). It will also be appreciated that the functionality attributed herein to SGS 140 and DCC 170 may be exemplary; the embodiments described herein may also support the use of other methods/systems determining whether there is a matching reference multimedia content element.

Each reference multimedia content element in database 150 is a previously captured multimedia content element representing an obstacle or other potential future scenario associated therewith. Each reference multimedia content element may be associated with at least one probability score, a risk score (e.g., reflecting one or more undesirable outcomes with possible damage that may occur), predetermined collision avoidance instructions, and the like. The collision avoidance instructions include, but are not limited to, one or more instructions for controlling the vehicle, e.g., to avoid an accident due to colliding with one or more obstacles.

Each reference multimedia content element may further be associated with a portion of a vehicle so as to indicate the location on the vehicle from which the reference multimedia content element was captured. To this end, in some embodiments, a reference multimedia content element may only match an input multimedia content element if, in addition to any signature matching, the reference multimedia content element is associated with the same or a similar portion of the vehicle (e.g., a portion on the same side of the vehicle).

As a non-limiting example, input multimedia content elements showing a dog approaching the car from 5 feet away that were captured by a camera deployed on a hood of the car may only match a reference multimedia content element showing a dog approaching the car from approximately 5 feet away that was captured by a camera deployed on the hood or other area on the front side of the car. The same reference multimedia content element may not match the input multimedia content element if the input multimedia content element was captured from a camera facing the rear of the vehicle. However, it will be appreciated that there may be a scenario in database 150 where the vehicle is in reverse (i.e., moving backwards) with a dog approaching from the rear. Accordingly, if the input multimedia content element showing a dog approaching from the rear is accompanied by additional information indicating that the vehicle is in reverse, it may still match a reference multimedia content element in database 150.

In accordance with embodiments described herein, when a potential collision is detected, driving policies generator 130 may be configured to generate an alert. The alert may indicate the potential cause of collision shown in the input multimedia content elements (i.e., a potential cause of collision associated with the matching reference multimedia content element), the at least one collision parameter associated with the matching reference multimedia content element (as stored in database 150), or both. The alert may further include one or more collision avoidance instructions to be executed by driving control system 120 to avoid the collision. The collision avoidance instructions may be instructions for configuring one or more portions of the driving control system such as, but not limited to, a braking system, a steering system, and the like.

In accordance with embodiments described herein, driving policies generator 130 may be configured to send the generated alert and/or the collision avoidance instructions to the driving control system 120. Alternatively, driving policies generator 130 may include driving control system 120 in an integrated module and may be further configured to control the vehicle based on the collision avoidance instructions.

It will be appreciated that only one driving control system 120 and one application 125 are described herein above with reference to FIG. 1 for the sake of simplicity and without limitation on the disclosed embodiments. Multiple driving control systems 120 may provide multimedia content elements via multiple applications 125, and appropriate driving decisions may be provided to each such instance of driving control system 120, without departing from the scope of the disclosure.

It should be noted that any of driving control system 120, sensors 160, driving policies generator 130, and database 150 may be integrated without departing from the scope of the disclosure.

Figure 2:
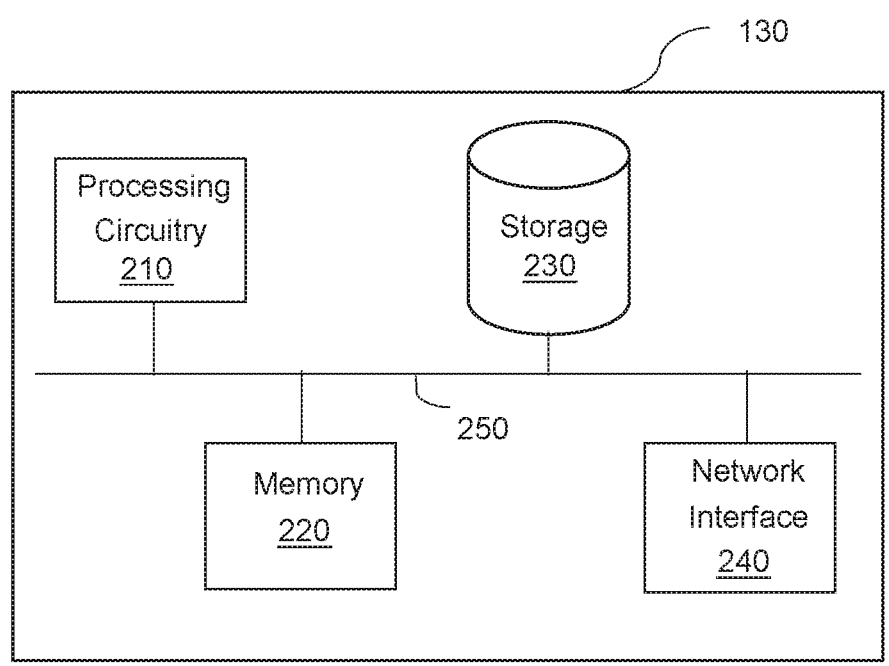
FIG. 2 is a schematic diagram of a driving policies' generator according to an embodiment.

Reference is now made to FIG. 2 which is an example schematic diagram of driving policies generator 130 according to an embodiment. Driving policies generator 130 comprises processing circuitry 210 coupled to memory 220, storage 230, and network interlace 240. The components of driving policies' generator 130 may be communicatively connected via bus 250.

Processing circuitry 210 may be Instantiated as one or more hardware logic components and circuits. For example, and without limitation, illustrative types of hardware logic components that may be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components capable of performing calculations and/or other manipulations of information. In accordance with embodiments described herein, processing circuitry 210 may be implemented as an array of at least partially statistically independent computational cores. The properties of each computational core may be set independently of those of each other core, as described further herein above.

Memory 220 may be volatile (e.g., RAM, etc.), non-volatile (e.g., ROM, flash memory, etc.), or a combination thereof. It will be appreciated that computer readable instructions to implement one or more embodiments disclosed herein may be stored in storage 230.

Memory 220 may also be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by processing circuitry 210, instruct the processing circuitry 210 to perform the various processes described herein. Specifically, the instructions, when executed, facilitate at least the generation by processing circuitry 210 of driving alerts based on multimedia content as described herein.

Storage 230 may be magnetic storage, optical storage, and the like, and may be implemented, for example, as flash memory or other memory technology, CD-ROM, Digital Versatile Disks (DVDs), or any other suitable medium which may be used to store the desired information.

Network interface 240 enables driving policies generator 130 to communicate with the signature generator system 140 and/or DCC 170 for the purpose of, for example, sending multimedia content elements, receiving signatures, and the like. Further, network interface 240 enables driving policies' generator 130 to obtain multimedia content elements from sensors 160 as well in order to determine a plurality of possible scenarios that may occur in light of the obstacles and the vehicle's movement.

It should be understood that the embodiments described herein are not limited to the specific architecture illustrated in FIG. 2, and other architectures may be equally used without departing from the scope of the disclosed embodiments. In particular, driving policies generator 130 may further include an integrated signature generator system functionally similar to SGS 140 that may be configured to generate signatures as described herein without departing from the scope of the disclosed embodiments.

Figure 3:
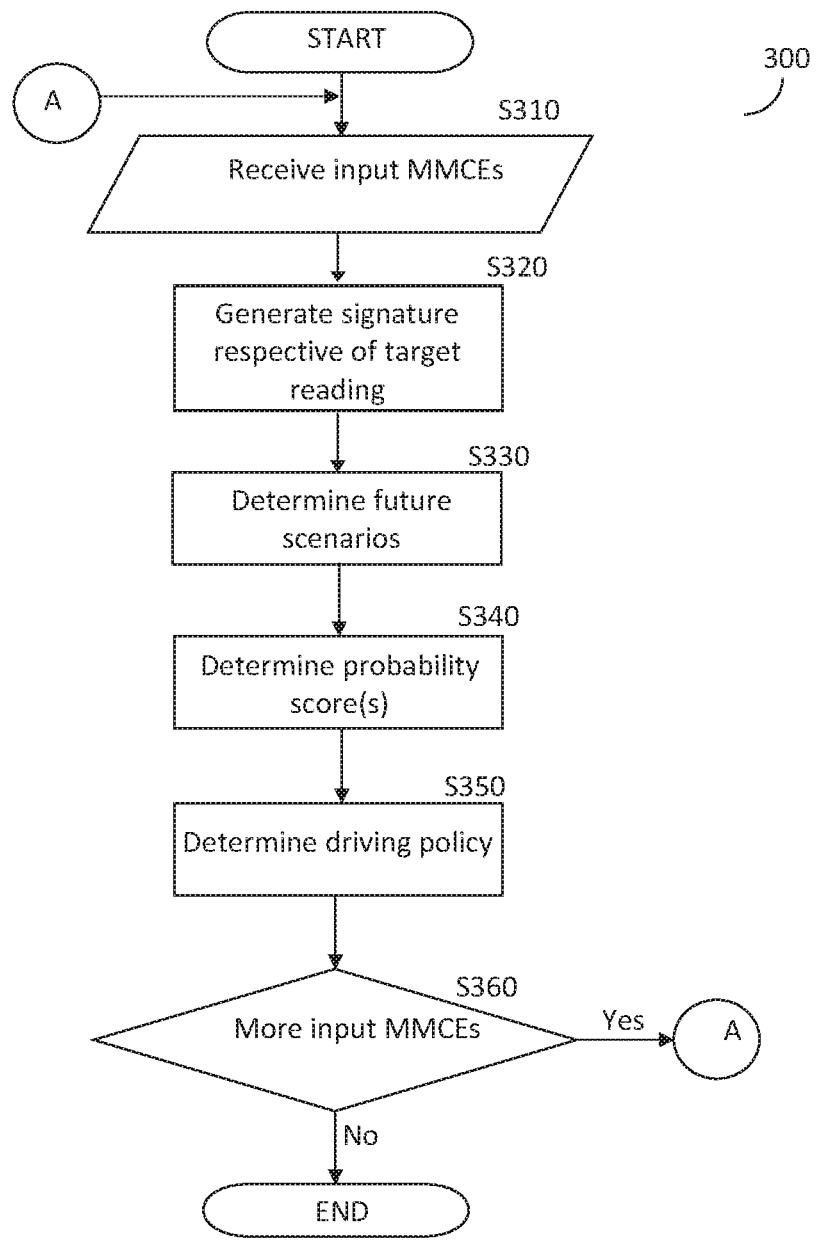
FIG. 3 is a flowchart illustrating a method for generating driving policies based on multimedia content elements according to an embodiment.

Reference is now made to FIG. 3 which depicts a flowchart 300 illustrating an exemplary method to be performed by driving policies generator 130 to generate driving policies based on multimedia content according to embodiments described herein. For example, as discussed hereinabove, driving policies generator 130 may generate driving policies based on multimedia content elements captured by sensors 160 (e.g., a camera) deployed in proximity to a vehicle such that the sensor signals indicate at least some features of the environment around the vehicle. The multimedia content elements may be captured during a trip, where the trip includes movement of the vehicle from a beginning location to a destination location.

Driving policies generator 130 may receive (step S310), input multimedia content elements (MMCEs) during a vehicle's trip. As described herein, the input multimedia content elements may be captured by sensors 160 deployed in proximity to the vehicle and may be, for example, received from sensors 160 via driving control system 120 which may be communicatively connected to sensors 160. The input multimedia content elements may be received in real-time, or near real-time, during the trip, thereby facilitating real-time provision of alerts to autonomous or assisted driving systems.

At least some of the input multimedia content elements may comprise obstacles shown therein. Such obstacles may include, both moving objects (e.g., pedestrians, other vehicles, animals, etc.) or stationary objects (e.g., signs, bodies of water, parked vehicles, statues, buildings, walls, etc.).

SGS 140 generates (step S320) signatures of the input multimedia content elements. The generation of signatures by SGS 140 is further described herein below with respect of FIGS. 4 and 5.

In accordance with embodiments described herein, step S320 may include SGS 140 generating (or at least causing generation) of at least one signature for each input multimedia content element and comparing the generated signatures for the input multimedia content element to signatures of the plurality of reference multimedia content elements. The reference multimedia content element signatures may be generated and stored in database 150 in a preprocessing step and/or during previous iterations of flowchart 300.

In accordance with embodiments described herein, step S320 may include generating the signatures via a plurality of at least partially statistically independent computational cores, where the properties of each core are set independently of the properties of the other cores. In another embodiment, S320 includes sending the multimedia content element(s) to signature generator system 140, to deep content classification system 170, or both, and receiving the plurality of signatures in return. Signature generator system 140 may comprise a plurality of at least statistically independent computational cores as described further herein. Deep content classification system 170 may be configured to autonomously define concepts for a wide variety of multimedia content elements in an unsupervised fashion.

In accordance with embodiments described herein, step S320 may include driving policies generator 130 querying DCC system 170 using the generated signatures to identify at least one concept matching the input multimedia content elements. The metadata of the matching concept may be used for correlation between a first signature (e.g., from the input MMCE) and at least a second signature (e.g., from a reference MMCE).

Driving policies generator 130 may determine (step S330), a plurality of future possible scenarios based on matches between the input and reference multimedia content elements. It will be appreciated that the vehicle's movement and the identification of one or more obstacles that may potentially collide with the vehicle may be factored into such a determination.

Driving policies generator 130 may determine (step S340) a probability score for each future scenario. The probability score can be determined by comparing the future scenarios to historical scenarios stored in the database 150 and determining the respective probability and characteristics associated therewith. It will be appreciated that at least some of the probability scores stored in database 150 may be determined and stored either in a preprocessing step and/or in previous iterations of flowchart 300; i.e., it will be appreciated that database may be at least partially populated with probability scores prior to a given iteration of flowchart 300. Driving policies generator 130 may then determine (step S350) driving policies for the future scenarios in light of their associated probability scores. The determination of the driving policies is further described hereinabove with respect of FIG. 1.

If additional input multimedia content elements have been received (step S360), process control may return to step S310. Otherwise, execution of flowchart 300 may terminate. Accordingly, execution of flowchart 300 may continue until the trip is completed by, for example, arriving at the destination location, the vehicle stopping at or near the destination location, and the like.

As a non-limiting example, input video may be received from a dashboard camera mounted on a car and facing forward such that the dashboard camera captures video of the environment in front of the car showing a pedestrian entering a crosswalk. The captured input video is obtained in real-time and analyzed to generate signatures therefore. The generated signatures are compared to signatures of reference videos. Based on the comparison, a plurality of possible future scenarios may be determined. Then, a probability of a collision between the vehicle and the pedestrian may be determined in light of at least current/expected movement of the vehicle and the pedestrian. A driving policy may then be determined based on the determined probability of collision. As an example, in case of high probability, a driving policy may be to slow down while arriving close to the crosswalk. In the case of an autonomous vehicle, the driving policy may be to brake, thereby avoiding collision with the pedestrian.

Figure 4:
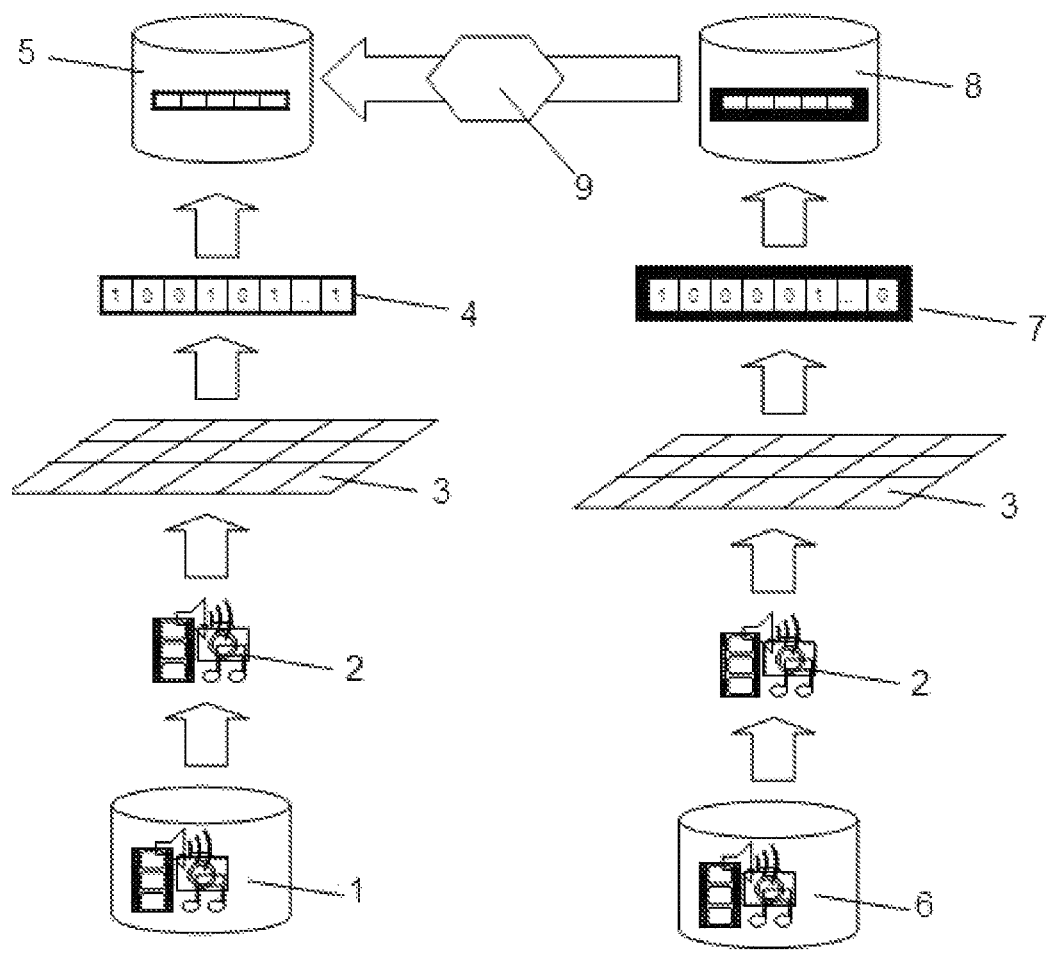
FIG. 4 is a block diagram depicting the basic flow of information in the signature generator system of FIG. 1.
Figure 5:
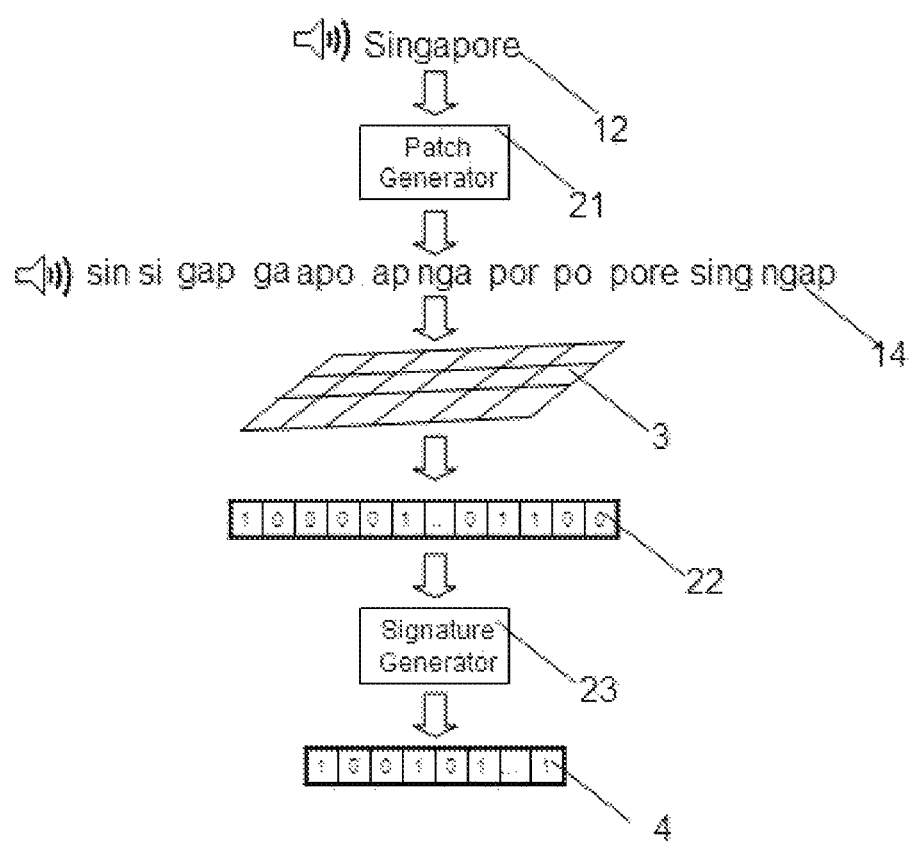
FIG. 5 is a diagram showing a flow of patches generation, response vector generation, and signature generation in a large-scale speech-to-text system.

Reference is now made to FIGS. 4 and 5 which together illustrate an exemplary implementation for the generation of signatures for the multimedia content elements by SGS 140. An exemplary high-level description of the process for large scale matching is depicted in FIG. 4. In this example, the matching is for video content.

Video content segments 2 from a master database (DB) 6 and a target DB 1 are processed in parallel by a large number of independent computational cores 3 that constitute an architecture for generating the signatures (hereinafter the "architecture"). Further details on the computational cores generation are provided below. The independent cores 3 generate a database 5 of robust signatures 4 for video content-segments 2 from target DB 1 and a database 8 of robust signatures 7 for video content-segments 2 from master DB 6. An exemplary and non-limiting process of signature generation for an audio component is shown in detail in FIG. 4. Finally, target robust signatures 4 and/or signatures are effectively matched, by a matching algorithm 9, to master robust signatures 7 and/or signatures database to find matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The matching system is extensible for signatures generation capturing the dynamics in-between the frames. In an embodiment the driving policies generator 130 may be configured with a plurality of computational cores to perform matching between signatures.

The signatures generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of driving policies generator 130 and SGS 140. Thereafter, all the K patches are injected in parallel into multiple computational cores 3 to generate K response vectors 22, which are fed into a signature generator system 23 to produce a database of robust signatures and signatures 4.

In order to generate robust signatures, i.e., signatures that are robust to additive noise L (where L is an integer equal to or greater than 1) by the computational cores 3, a frame 'i' is injected into the cores 3. Then, cores 3 generate two binary response vectors: $\vec{S}$ which is a signature vector, and $\vec{RS}$ which is a robust signature vector.

For generation of signatures robust to additive noise, such as White-Gaussian-Noise, scratch, etc., but not robust to distortions typical in video elements, e.g., crop, shift and rotation, etc., a core $Ci=\{n_i\}(1 \leq i \leq L)$ may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); kj is an image component T (for example, grayscale value of a certain pixel j); $Th_x$ is a constant Threshold value, where 'x' is 'S' for signature and 'RS' for robust signature; and $V_i$ is a Coupling Node Value.

The Threshold values $Th_x$ are set differently for signature generation and for robust signature generation. For example, for a certain distribution of $V_i$ values (for the set of nodes), the thresholds for signature ($Th_S$) and robust signature ($Th^{RS}$) are set apart, after optimization, according to at least one or more of the following criteria:

For: $V_i > Th_{RS}$
$1-P(V>Th_S)-1-(1-e)^1 \ll 1$,
i.e., given that 1 nodes (cores) constitute a robust signature of a certain image I, the probability that not all of these 1 nodes will belong to the signature of same, but noisy image, p is sufficiently low (according to a system's specified accuracy).
$2: 1-P(V_i > Th_{RS}) \approx 1/L$
i.e., approximately 1 out of the total L nodes can be found to generate a robust signature according to the above definition.

3: Both robust signature and signature are generated for certain frame i.

It should be understood that even though the generation of a signature uses lossless compression, where the characteristics of the compressed data are maintained, the uncompressed data of the underlying multimedia content element may not be reconstructed; a generated signature may be unidirectional in that the lossless compression may be used on only a portion of the multimedia content element such that the entire element may not be reconstructed by merely reversing the lossless compression. However, the use of lossless compression facilitates the purpose of comparison to another signature without the need of comparison to the original data. The detailed description of the Signature generation can be found in U.S. Pat. Nos. 8,326,775 and 8,312,031, assigned to the common assignee, which are hereby incorporated by reference.

A computational core generation is a process of definition, selection, and tuning of the parameters of the cores for a certain realization in a specific system and application. The process may be based on several design considerations, such as:

(a) The cores are designed so as to obtain maximal independence, i.e., the projection from a signal space should generate a maximal pair-wise distance between any two cores' projections into a high-dimensional space.

(b) The cores are optimally designed for the type of signals, i.e., the cores are maximally sensitive to the spatio-temporal structure of the injected signal, for example, and in particular, sensitive to local correlations in time and space. Thus, in some cases a core represents a dynamic system, such as in state space, phase space, edge of chaos, etc., which may be uniquely used herein to exploit their maximal computational power.

(c) The cores are optimally designed with regard to invariance to a set of signal distortions, of interest in relevant applications.

A detailed description of computational core generation and the process for configuring such cores is discussed in more detail in U.S. Pat. No. 8,655,801 which is assigned to the common assignee, the contents of which are hereby incorporated by reference.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

It should be noted that various embodiments described herein are discussed with respect to autonomous driving decisions and systems and are merely for simplicity and without limitation on the disclosed embodiments. The embodiments disclosed herein are equally applicable to other assisted driving systems such as, for example, accident detection systems, lane change warning systems, and the like. In such example implementations, the automated driving decisions may be generated, e.g., only for specific driving events.

The various embodiments disclosed herein may be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The term "non-transitory", as used herein, is a limitation of the medium itself (i.e., tangible, not a signal) as opposed to a limitation on data storage persistency (e.g., RAM vs. ROM).

All examples and conditional language recited herein are intended for pedagogical purposes to aid the reader in understanding the disclosed embodiments and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for determining driving policies for a vehicle, comprising:
   receiving, in real-time during a trip of a vehicle and during a current iteration of the method, at least a set of input multimedia content elements captured by at least one sensor deployed in proximity to the vehicle;
   determining, a plurality of possible future scenarios based at least on the set of input multimedia content elements; wherein at least two possible future scenarios of the plurality of possible future scenarios have undesirable outcomes;
   determining a probability score for each of the plurality of possible future scenarios to provide a plurality of probability scores;
   generating a risk score that represents a combined, weighted probability score of the at least two possible future scenarios;
   determining at least one driving policy, wherein the determining comprises selecting the at least one driving policy to decrease risk associated with the risk score; and
   controlling the vehicle according to the at least one driving policy.

2. The method of claim 1, further comprising: generating, at least one signature for each one multimedia content element of the set of input multimedia content elements, wherein the plurality of possible future scenarios is determined by at least matching the at least one signature to at least one reference signature associated with at least one of the plurality of future scenarios; wherein the at least one reference signature is generated during the previous iteration of the method.

3. The method of claim 2, wherein each of the at least one reference signature is associated with one or more concepts, wherein each concept of the one or more concepts is a collection of associated signatures and metadata.

4. The method of claim 1, wherein the set of multimedia content elements includes at least one of: an image; a video, or at least an audio signal.

5. The method of claim 1, wherein the least two possible future scenarios of the plurality of possible future scenarios comprise (a) a possible future scenario of colliding with an object captured in the set of input multimedia content elements have undesirable outcomes, and (b) colliding with another object when driving to avoid the colliding with the object.

6. The method of claim 1, wherein the determining a plurality of possible future scenarios is also based on an environmental state for the vehicle as indicated by non-image based information provided by at least one electronic control unit (ECU) in the vehicle.

7. The method of claim 6, wherein the at least one ECU controls at least one of the vehicle's doors, windows, engine, power steering, seats, speed, telematics, transmission, brakes, or battery.

8. The method of claim 1, wherein the determining a plurality of possible future scenarios is also based on an environmental state for the vehicle as indicated by information provided by a service external to the vehicle.

9. The method of claim 1, wherein the determining of a probability score of at least one possible future scenario is calculated during a previous iteration of the method; wherein the previous iteration of the method is executed during the trip of the vehicle.

10. The method according to claim 1 wherein the set of input multimedia content elements are indicative of a scenario and wherein the determining of the probability score for each of the plurality of possible future scenarios comprises comparing between numbers of occurrences of each of the plurality of possible future scenarios given the scenario.

11. A vehicle driving system, comprising:
processing circuitry;
at least one sensor operative to capture at least a set of input multimedia content elements in real-time during a trip of a vehicle;
a driving policies generator application to be executed by the processing circuitry and operative to:
determine, during a current iteration, a plurality of possible future driving scenarios based at least on the set of input multimedia content elements, wherein at least two possible future scenarios of the plurality of possible future scenarios have undesirable outcomes;
determine a probability score for each of the plurality of possible future driving scenarios to provide a plurality of probability scores;
generate a risk score that represents a combined, weighted probability score of the at least two possible future scenarios; and
determine at least one driving policy by selecting the at least one driving policy to decrease risk associated with the risk score; and
a driving control system operative to control the vehicle according to the at least one driving policy.

12. The system of claim 11, further comprising: a signature generating system to be executed by the processing circuitry to generate at least one signature for each multimedia content element of the set of input multimedia content elements, wherein the driving policies generator application is further operative to determine the plurality of possible future driving scenarios by at least matching the at least one signature to at least one reference signature associated with at least one of the plurality of future scenarios; and wherein the at least one reference signature is generated during the previous iteration of the method.

13. The system of claim 12, wherein each reference signature is associated one or more concepts, wherein each concept of the one or more concepts is a collection of associated signatures and metadata.

14. The system of claim 11, wherein each multimedia content element of the set of input multimedia content elements is at least one of: an image, or a video, or at least an audio signal.

15. The system of claim 11, wherein the driving policies generator application is also operative to determine the plurality of possible future driving scenarios based at least in part on an environmental state for the vehicle as indicated by non-image based information provided by at least one electronic control unit (ECU) in the vehicle.

16. The system of claim 15, wherein the at least one ECU controls at least one of the vehicle's doors, windows, engine, power steering, seats, speed, telematics, transmission, brakes, or battery.

17. The system of claim 11, wherein the driving policies generator application is also operative to determine the plurality of possible future driving scenarios based at least in part on an environmental state for the vehicle as indicated by information provided by a service external to the vehicle.

18. The system of claim 11, wherein the least two possible future scenarios of the plurality of possible future scenarios comprise (a) a possible future scenario of colliding with an object captured in the set of input multimedia content elements have undesirable outcomes, and (b) colliding with another object when driving to avoid the colliding with the object.

19. The system of claim 11, wherein the determining of a probability score of at least one possible future scenario is calculated during a previous iteration of the method; wherein the previous iteration of the method is executed during the trip of the vehicle.

20. A vehicle driving system comprising:
means for receiving, in real-time during a trip of a vehicle, at least a set of input multimedia content elements captured by at least one sensor deployed in proximity to the vehicle;
means for determining, during a current iteration, a plurality of possible future scenarios based at least on the set of input multimedia content elements; wherein at least two possible future scenarios of the plurality of possible future scenarios have undesirable outcomes;
means for determining a probability score for each of the plurality of possible future scenarios to provide a plurality of probability scores;
means for generating a risk score that represents a combined, weighted probability score of the at least two possible future scenarios;
means for determining at least one driving policy wherein the determining comprises selecting the at least one driving policy to decrease risk associated with the risk score; and
means for controlling the vehicle according to the at least one driving policy.

* * * * *